United States Patent
Whitehead et al.

(10) Patent No.: US 6,422,640 B2
(45) Date of Patent: Jul. 23, 2002

(54) DOOR TRIM PANEL ASSEMBLY AND METHOD OF MAKING

(75) Inventors: David Wayne Whitehead, Rochester Hills; Arthur Carl Stein, Grosse Ile; Pamela Lane Codd, Rochester; Stevie P Johnson, Shelby Township, all of MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/748,968

(22) Filed: Dec. 27, 2000

Related U.S. Application Data

(60) Provisional application No. 60/173,654, filed on Dec. 30, 1999.

(51) Int. Cl.[7] .................................................. B60J 5/00
(52) U.S. Cl. ....................... 296/146.7; 296/39.1; 49/502
(58) Field of Search ............................. 296/146.7, 33.1, 296/146.6; 49/502; 156/213; 280/728.3, 743.1, 732

(56) References Cited

U.S. PATENT DOCUMENTS

| | | | |
|---|---|---|---|
| 3,808,743 A | | 5/1974 | Renner et al. |
| 3,964,208 A | | 6/1976 | Renner et al. |
| 3,989,275 A | | 11/1976 | Finch et al. |
| 4,411,944 A | | 10/1983 | Moore |
| 4,519,964 A | | 5/1985 | Rosen |
| 4,549,761 A | * | 10/1985 | Lee et al. .................... 296/146 |
| 4,562,025 A | | 12/1985 | Gray |
| 4,662,115 A | * | 5/1987 | Ohya et al. .................... 49/502 |
| 4,766,025 A | | 8/1988 | Sanok et al. |
| 4,783,114 A | | 11/1988 | Welch |
| 4,800,681 A | * | 1/1989 | Skillen et al. ................. 49/502 |
| 4,806,094 A | | 2/1989 | Rhodes, Jr. et al. |
| 4,827,671 A | * | 5/1989 | Herringshaw et al. ......... 49/502 |
| 4,845,894 A | * | 7/1989 | Herringshaw et al. ......... 49/502 |
| 5,004,292 A | | 4/1991 | Horne |
| 5,040,335 A | | 8/1991 | Grimes |
| 5,095,659 A | * | 3/1992 | Benoit et al. .................. 49/502 |
| 5,102,163 A | | 4/1992 | Ishikawa |
| 5,143,667 A | | 9/1992 | Matsuura et al. |
| 5,224,299 A | | 7/1993 | Abe |
| 5,271,885 A | | 12/1993 | Denker et al. |
| 5,306,068 A | | 4/1994 | Nakae et al. |
| 5,328,651 A | | 7/1994 | Gallagher et al. |
| 5,340,425 A | | 8/1994 | Strapazzini |
| 5,387,390 A | | 2/1995 | Kornylo |
| 5,411,688 A | | 5/1995 | Morrison et al. |
| 5,418,032 A | * | 5/1995 | Martin ......................... 428/71 |
| 5,419,606 A | * | 5/1995 | Hull et al. ................ 296/146.7 |
| 5,462,482 A | * | 10/1995 | Grimes ..................... 296/146.7 |
| 5,482,344 A | | 1/1996 | Walker et al. |
| 5,535,553 A | * | 7/1996 | Staser et al. ................... 49/502 |
| 5,535,571 A | | 7/1996 | Nichols |
| 5,580,119 A | | 12/1996 | Uchida et al. |
| 5,580,501 A | | 12/1996 | Gallagher et al. |
| 5,595,415 A | | 1/1997 | Beaulat |
| 5,603,548 A | | 2/1997 | Gandhi et al. |
| 5,618,477 A | | 4/1997 | Suzuki |
| 5,626,382 A | * | 5/1997 | Johnson et al. ........... 296/146.7 |
| 5,695,865 A | | 12/1997 | Shimizu |
| 5,762,394 A | * | 6/1998 | Salmonowicz et al. .. 296/146.5 |

(List continued on next page.)

FOREIGN PATENT DOCUMENTS

| | | |
|---|---|---|
| JP | 52-27665 | 7/1977 |
| JP | 55-118837 | 9/1980 |

*Primary Examiner*—Ken Patel
(74) *Attorney, Agent, or Firm*—Kathryn A. Marra

(57) ABSTRACT

A door trim panel assembly and method of making same for attachment to structure of a vehicle includes a door trim panel and a carrier formed from a plastic material attached to the door trim panel and for attachment to the structure of the vehicle. The door trim panel assembly also includes a seal integral with the carrier for contacting the structure to seal the carrier to the structure.

10 Claims, 3 Drawing Sheets

U.S. PATENT DOCUMENTS

| | | | | |
|---|---|---|---|---|
| 5,866,232 A | * | 2/1999 | Gatzmanga | 49/490.1 |
| 5,904,002 A | * | 5/1999 | Emerling et al. | 49/502 |
| 5,924,760 A | | 7/1999 | Krajewski et al. | |
| 5,928,776 A | | 7/1999 | Shioya et al. | |
| 5,947,547 A | * | 9/1999 | Deels et al. | 296/146.7 |
| 6,149,224 A | * | 11/2000 | Tiberia et al. | 296/146.7 |
| 6,174,396 B1 | * | 1/2001 | Casteel et al. | 156/213 |
| 6,196,607 B1 | * | 3/2001 | Gulisano | 296/146.7 |
| 6,197,403 B1 | * | 3/2001 | Brown et al. | 296/39.1 |
| 6,210,613 B1 | * | 4/2001 | Stein et al. | 264/45.4 |
| 2001/0025456 A1 | * | 10/2001 | Furuyama et al. | |

* cited by examiner

DOOR TRIM PANEL ASSEMBLY AND METHOD OF MAKING

CROSS-REFERENCE TO RELATED APPLICATION(S)

The present invention claims the priority date of copending U.S. Provisional Patent Application Serial No. 60/173,654, filed Dec. 30, 1999.

TECHNICAL FIELD

The present invention relates generally to door trim panels for vehicles and, more particularly, to a door trim panel assembly for a vehicle.

BACKGROUND OF THE INVENTION

It is known to provide a door trim panel assembly for a vehicle such as an automotive vehicle to present an aesthetically pleasing appearance in an occupant compartment of the vehicle. The door trim panel assembly includes a plurality of separate components with each component having a specific function. The components typically include a door trim panel, sound absorber, water barrier, insert, armrest, map pocket closeout, and side impact blocks. The components are assembled together and attached to a door trim substrate by several different conventional processes including adhesives, heat staking, sonic welding, and fasteners.

The door trim substrate supports the components including the door trim panel and is not thick enough to touch an inner panel of the door since the materials for the substrate cannot be molded that thick. As a result, the door trim panel assembly uses a flat or pre-molded sheet material in conjunction with a bead of pre-applied butyl caulk. A release paper is attached to the caulk so that the parts can be stacked. The door trim panel assembly is then mounted to the inner panel of the door for the vehicle by removing the release paper and attaching with suitable means such as fasteners.

Although the above door trim panel assembly has worked, it is desirable to provide a seal on a backside or outer surface thereof of the door trim panel assembly. It is also desirable to provide a door trim panel assembly with an integrally molded seal in an expanded polypropylene substrate that reduces parts, cost, and assembly. It is further desirable to provide a door trim panel assembly with a direct applied seal and an expanded polypropylene substrate that reduces parts, cost, and assembly. Therefore, there is a need in the art to provide an improved door trim panel assembly for attachment to an inner panel of a door for a vehicle that meets these desires.

SUMMARY OF THE INVENTION

It is, therefore, one object of the present invention to provide a new door trim panel assembly for a vehicle.

It is another object of the present invention to provide a door trim panel assembly that has an integrally molded seal into a single component for attachment to an inner panel of a door for a vehicle.

It is yet another object of the present invention to provide a door trim panel assembly that has a direct applied seal into a single component for attachment to an inner panel of a door for a vehicle.

It is still another object of the present invention to provide a door trim panel assembly that has fewer components and cost.

To achieve the foregoing objects, the present invention is a door trim panel assembly for attachment to structure of a vehicle including a door trim panel and a carrier formed from a plastic material attached to the door trim panel and for attachment to the structure of the vehicle. The door trim panel assembly also includes a seal integral with the carrier for contacting the structure to seal the carrier to the structure.

In addition, the present invention is a method of making a door trim panel assembly for attachment to structure of a vehicle. The method includes the steps of placing a door trim panel into a cavity of a mold and filling the cavity with a plastic material. The method also includes the steps of introducing steam into the mold to expand the plastic material to form a carrier with an integral seal and bond the carrier against the door trim panel to form a single door trim panel assembly.

One advantage of the present invention is that a new door trim panel assembly is provided for a vehicle. Another advantage of the present invention is that the door trim panel assembly has an integrally molded seal and/or direct applied seal with an expanded polypropylene carrier or substrate that eliminates traditional watershields in doors for vehicles. Yet another advantage of the present invention is that the door trim panel assembly reduces the number of parts, labor, cost, and tooling for the same. Still another advantage of the present invention is that the door trim panel assembly improves serviceability and assembly plant handling since butyl caulk and release paper are eliminated. A further advantage of the present invention is that the door trim panel assembly has enhanced performance and saves the cost of traditional watershields, which increases the content on the door trim.

Other objects, features, and advantages of the present invention will be readily appreciated, as the same becomes better understood, after reading the subsequent description taken in conjunction with the accompanying drawings.

DESCRIPTION OF THE PREFERRED EMBODIMENT

Figure 1:
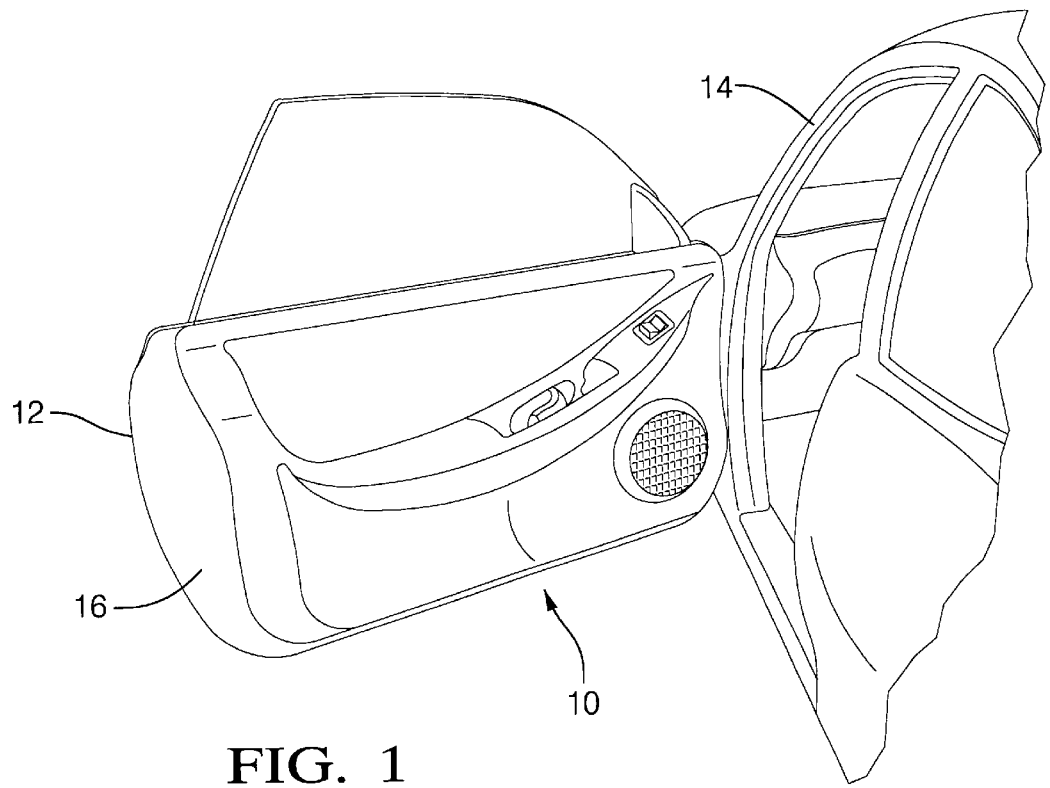
FIG. 1 is a perspective view of a door trim panel assembly, according to the present invention, illustrated in operational relationship with a vehicle.
Figure 2:
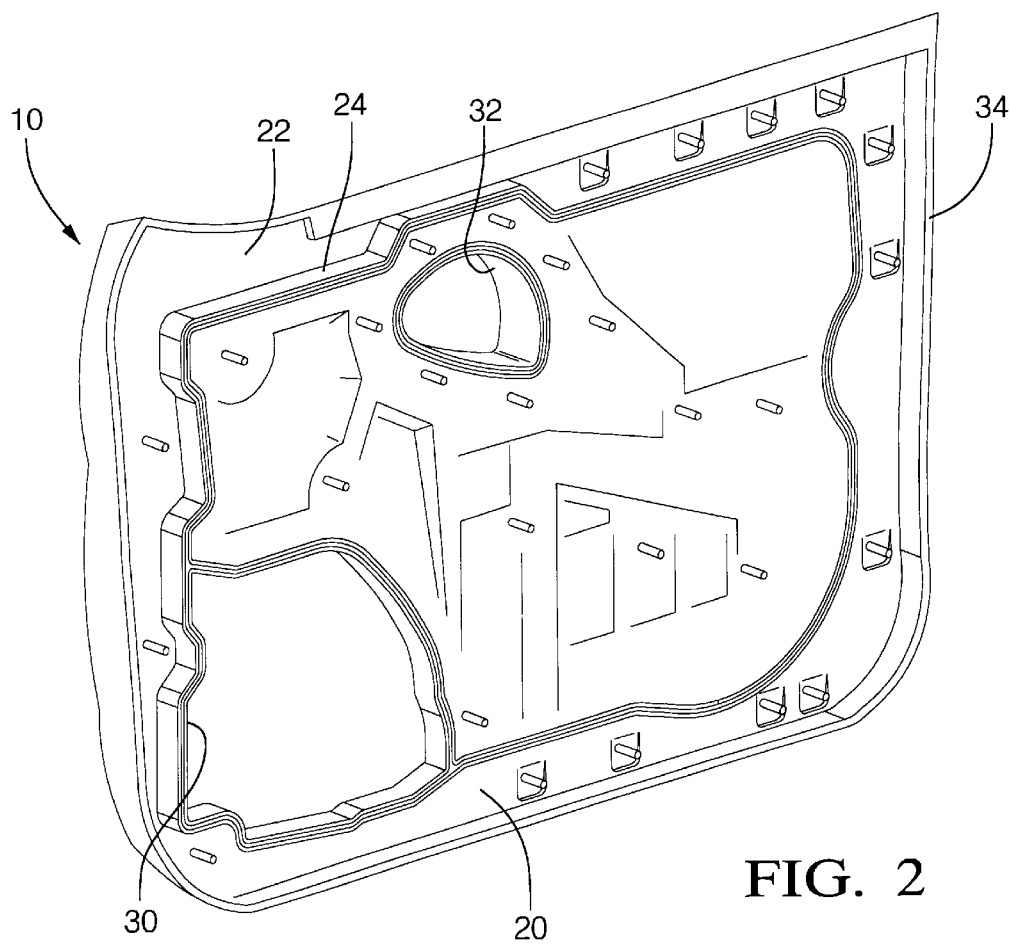
FIG. 2 is a perspective rear view of the door trim panel assembly of FIG. 1.

Referring to the drawings and in particular FIGS. 1 and 2, one embodiment of a door trim panel assembly 10, according to the present invention, is shown for structure such as a door 12 of a vehicle 14. It should be appreciated that, in this example, the door trim panel assembly 10 is mounted to an inner panel 16 of the door 12. It should also be appreciated that the door trim panel assembly 10 may be an assembly mounted to other panels of the vehicle 14.

Figure 3:
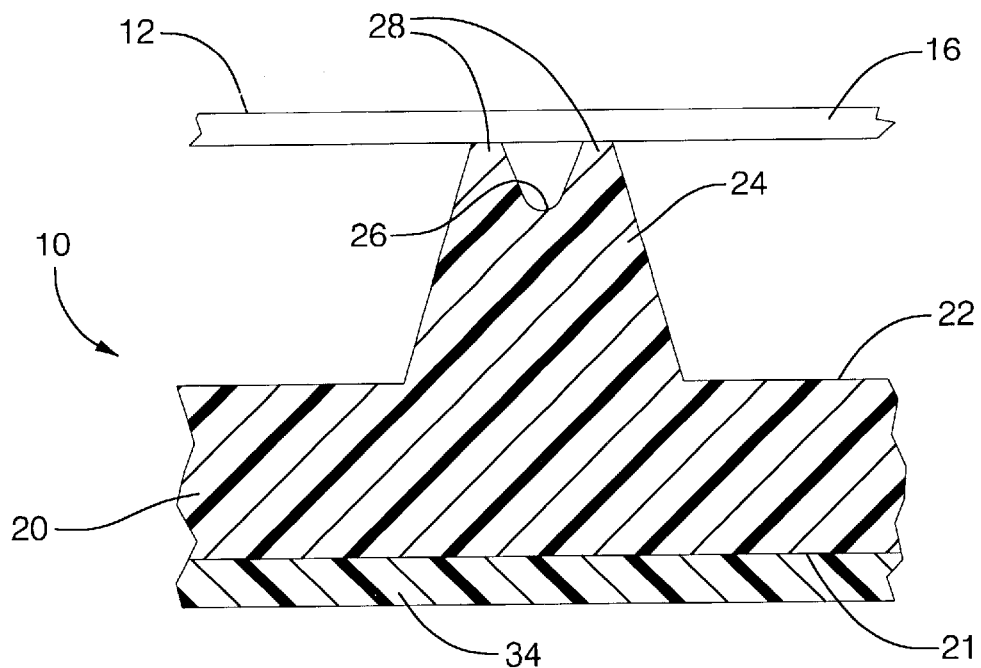
FIG. 3 is a fragmentary view of an integrally molded seal of the door trim panel assembly of FIG. 1.

Referring to FIGS. 2 and 3, the door trim panel assembly 10 includes a door trim substrate or carrier 20 extending longitudinally and vertically and having a generally rectangular shape. The carrier 20 is made of a plastic material such as polypropylene. Preferably, the carrier 20 is made of expanded polypropylene (EPP). The carrier 20 is formed by a method, according to the present invention, to be described. The carrier 20 has a first side 21 and an opposed second side 22. The second side 22 is attached to the inner panel 16 of the door 12 by suitable means such as fasteners (not shown). It should be appreciated that the carrier 20 may be molded thick enough to contact the inner panel 16 of the door 12 when mounted to the door 12.

The door trim panel assembly 10 also includes at least one seal 24 incorporated or integrated into the carrier 20. The seal 24 extends longitudinally and vertically around the carrier 20. The seal 24 has a groove 26 extending therealong and inwardly to form a pair of laterally spaced projections 28. The groove 26 allows the projections 28 to compress and seal against the inner panel 16 of the door 12. The seal 24 is made of a plastic material such as polypropylene, preferably expanded polypropylene. The expanded polypropylene is compliant enough at predetermined densities (2.8 to 3.5 pcf) to conform to the sheet metal of the inner panel 16 of the door 12. The seal 24 is molded as part of the second side 22 of the carrier 20 by the plastic material of the carrier 20. It should be appreciated that the seal 24 and carrier 20 are integral, unitary, and formed as one-piece. It should also be appreciated that the seal 24 surrounds any openings 30,32 in the inner panel 16, as well as the entire perimeter of the inner panel 16 of the door 12. It should be further appreciated that the seal 24 acts as a water seal and water that enters the interface area between the door trim panel assembly 10 and the inner panel 16 of the door 12 is channeled to drains (not shown) at the bottom of the door 12. It should be still further appreciated that the seal 24 is illustrated as uncompressed in FIG. 3.

The door trim panel assembly 10 includes a finished door trim panel 34. The door trim panel 34 extends longitudinally and vertically and is generally rectangular in shape. The carrier 20 conforms to the shape of the door trim panel 34 such that the carrier 20 is disposed within the door trim panel 34. The door trim panel 34 is made of a relatively rigid material such as hard plastic, covered plastic, and covered cellulose based material or composite of the like. The covering can be fabric, vinyl, cloth, TPO, leather, carpet, or a combination thereof. The door trim panel 34 is formed by a suitable thermoplastic molding or forming process such as injection molding, compression molding, thermoforming or the like. Preferably, the door trim panel 34 is made of polypropylene and formed by conventional injection molding processes as is known in the art. The door trim panel 34 is attached to the carrier 20 by molding the carrier 20 to the door trim panel 34 by a method to be described. It should be appreciated that the door trim panel 34 presents a class A surface as is known in the art. It should also be appreciated that the door trim panel 34 is conventional and known in the art.

Figure 4:
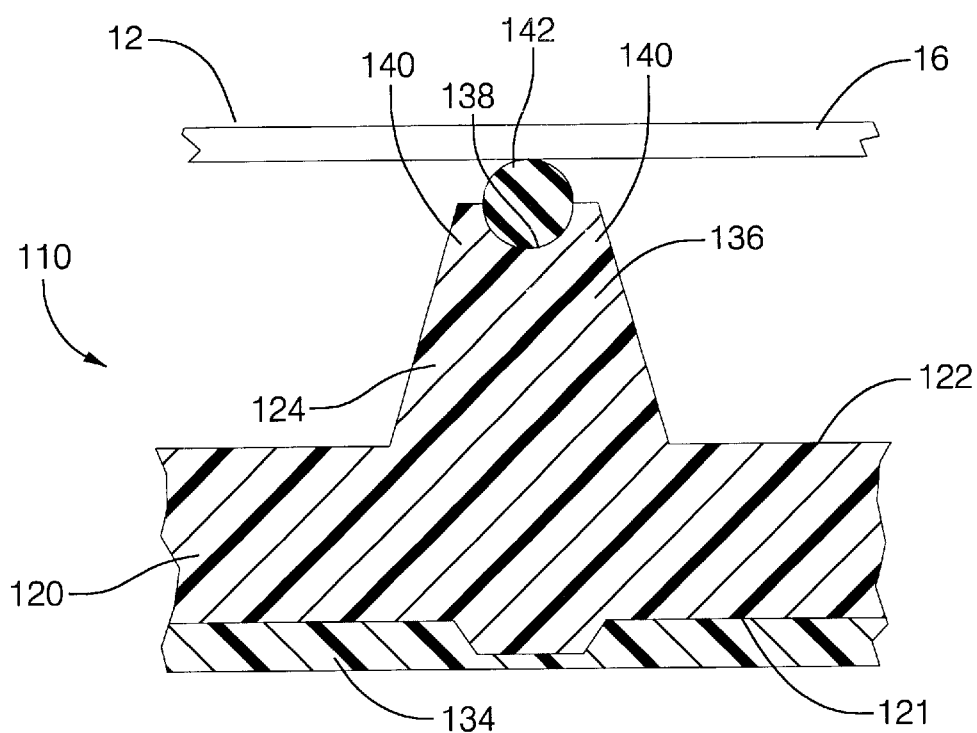
FIG. 4 is a fragmentary view of another embodiment, according to the present invention, of the door trim panel assembly of FIG. 1 illustrating a direct applied seal of the door trim panel assembly.
Figure 5:
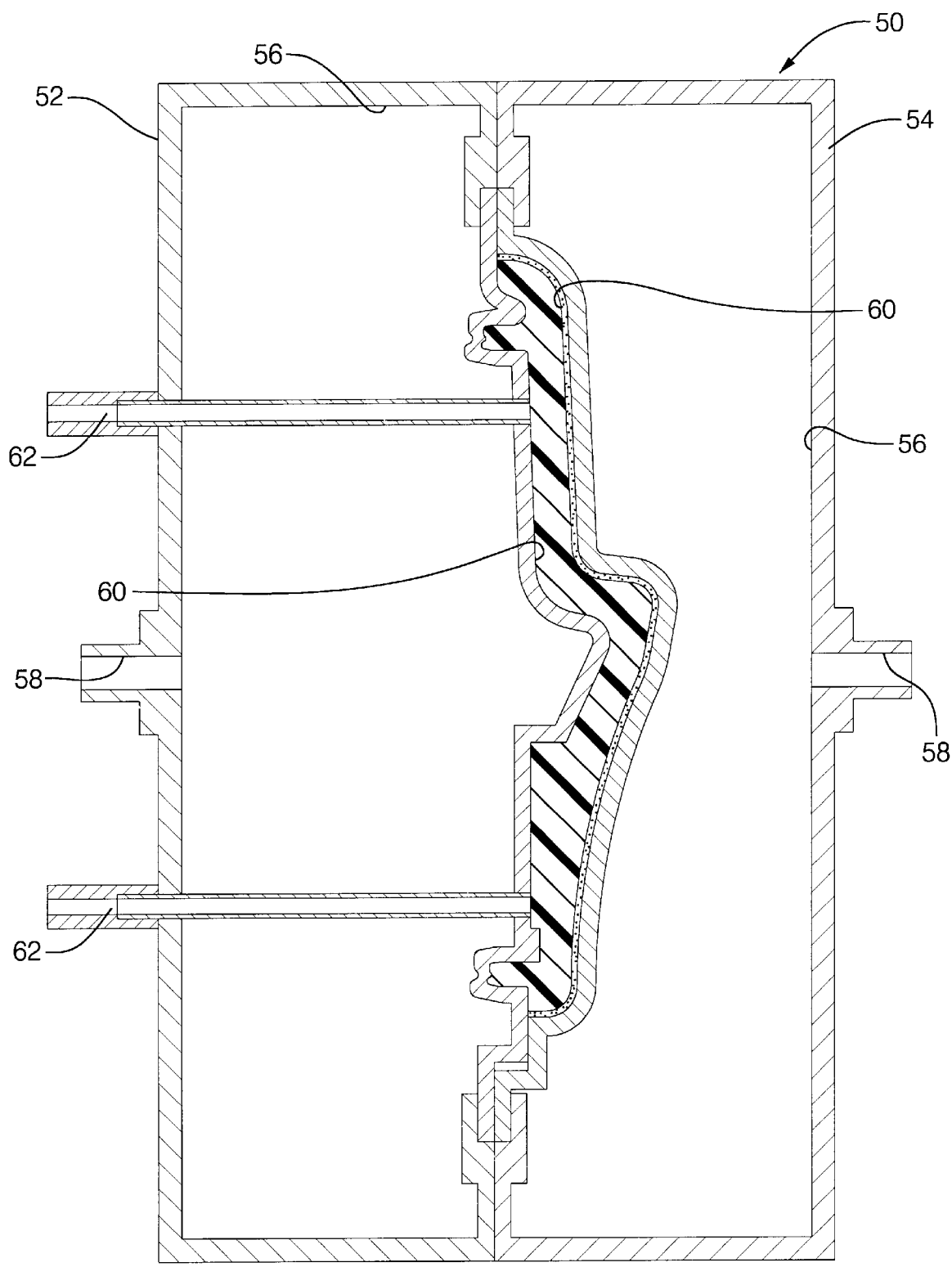
FIG. 5 is a fragmentary elevational view of a mold for a method, according to the present invention, of making the door trim panel assembly of FIG. 1.

Referring to FIG. 4, another embodiment 110, according to the present invention, of the door trim panel assembly 10 is shown. Like parts of the door trim panel assembly 10 have like reference numerals increased by one hundred (100). In this embodiment, the door trim panel assembly 110 includes the carrier 120 having the first side 121 and the second side 122 and the door trim panel 134. The door trim panel assembly 110 also includes the seal 124 having at least one seal retainer 136 incorporated or integrated into the carrier 120. The seal retainer 136 extends longitudinally and vertically around the carrier 120. The seal retainer 136 has a groove 138 extending therealong and inwardly to form a pair of laterally spaced projections 140. The seal 124 also includes a directly applied sealing member 142 disposed in the groove 138 to compress and seal against the inner panel 16 of the door 12. The seal retainer 136 is made of a plastic material such as polypropylene. The sealing member 142 is made of a suitable material such as butyl rubber, one component urethane, two component urethane, no tack foamed hot melt, low tack foamed hot melt, high tack foamed hot melt, silicone or the like. The seal retainer 136 is molded as part of the second side 122 of the carrier 120 by the plastic material of the carrier 120. It should be appreciated that the seal retainer 136 and carrier 120 are integral, unitary, and formed as one-piece. It should also be appreciated that the sealing member 142 is illustrated as uncompressed in FIG. 4.

A method, according to the present invention, of making the door trim panel assembly 10 is disclosed. A mold, generally indicated at 50, includes a first half mold 52 and a second half mold 54. The first and second half molds 52 and 54 are generally hollow to form a chamber 56. The first and second half molds 52 and 54 have an inlet 58 for allowing a fluid such as steam to enter the chamber 56 of the first and second half molds 52 and 54. The first and second half molds 52 and 54 each include a mold cavity 60 for forming the carrier 20. The first half mold 52 includes at least one, preferably a plurality of fill inlets 62 extending into the mold cavity 60 to allow fill guns (not shown) to fill the mold cavity 60 with the plastic material for the carrier 20. It should be appreciated that the mold 50 is conventional and known in the art.

The method, according to the present invention, includes the step of forming the door trim panel 34,134 by conventional processes such as injection molding or other suitable thermoplastic molding or forming process (i.e., compression molding, thermoforming, etc.). The door trim panel 34,134 is preferably designed with at least one, preferably a plurality of "undercut" members to facilitate mechanical bonding of the carrier 20,120. The method may include the step of preheating the door trim panel 34,134 using an infrared oven (not shown) or the like. Preferably, the door trim panel 34,134 would be demolded from the injection molder (not shown) at higher-than-ambient temperature and placed into the mold cavity 60 of the mold 50.

The method includes the step of placing the door trim panel 34,134 into the mold cavity 60 of the mold 50. The method includes the step of closing the mold 50 and filling the mold cavity 60 with the plastic material for the carrier 20,120. In the preferred embodiment, the plastic material is expanded polypropylene. As such, the mold cavity 60 is filled with beads of expanded polypropylene, which enter the mold 50 via the fill inlets 62. Next, the method includes the step of introducing steam into the mold 50 via the inlets 58 to expand the plastic material to form the carrier 20, 120 and seal 24 or seal retainer 136 and bonding the plastic material to the door trim panel 34,134 to form a single door trim panel assembly 10,110. In particular, steam enters the chambers 56 of the first and second half molds 52 and 54 through the inlets 58. The beads of expanded polypropylene are fused together with mechanical and thermoplastic bonding occurring to the door trim panel 34,134. It should be appreciated that the steam enters through openings in the door trim panel 34,134 and through openings in the first half mold 52 to expand the beads of polypropylene.

The method may include the step of cooling the mold 50 by spraying a coolant such as water through nozzles (not shown) onto the backside of the mold cavity 60 of the mold 50. Once the door trim panel assembly 10,110 is cooled or after a suitable time for fusion and cooling, the method includes the step of opening the mold 50 and removing or demolding the door trim panel assembly 10,110 from the mold 50.

For the door trim panel assembly 110, the method includes the step of placing the door trim panel assembly 110 on a holding fixture (not shown) and applying the sealing member 142 to the seal retainer 136 by an apparatus such as a robot (not shown) and disposing the sealing member 142 in the groove 138. Finally, the method includes attaching the door trim panel assembly 10,110 to the inner panel 16 of the door 12 by suitable means such as fasteners, adhesives, heat staking, sonic welding or the like or the natural adhesive characteristics of the seal material itself (foamed hot melts) to hold the seal 24,124 tightly against the inner panel 16 of the door 12. It should be appreciated that the seal 24 or applied sealing member 142 in combination with the expanded polypropylene (EPP) material or surface itself seals water and vapor from entering the vehicle 14 through the door 12.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A door trim panel assembly for attachment to structure of a vehicle comprising:

a door trim panel;

a carrier formed from a plastic material disposed within said door trim panel and attached to said door trim panel for attachment to the structure of the vehicle; and a seal integral with said carrier for contacting the structure to seal said carrier to the structure.

2. A door trim panel assembly as set forth in claim 1 wherein said plastic material is comprises expanded polypropylene.

3. A door trim panel assembly as set forth in claim 1 wherein said seal extends longitudinally and vertically around said carrier.

4. A door trim panel assembly for attachment to a structure of a vehicle comprising:

a door trim panel;

a carrier formed from a plastic material attached to said door trim panel and for attachment to the structure of the vehicle; and a seal integral with said carrier for contacting the structure to seal said carrier to the structure, wherein said seal includes a groove extending therealong and inwardly.

5. A door trim panel assembly as set forth in claim 4 wherein said seal includes a pair of laterally spaced projections, said groove being disposed between said projections.

6. A door trim panel assembly as set forth in claim 4 wherein said seal includes a sealing member disposed in said groove.

7. A door trim panel assembly as set forth in claim 1 wherein said carrier has a first side and a second side.

8. A door trim panel assembly as set forth in claim 7 wherein said seal extends from said second side.

9. A door trim panel assembly as set forth in claim 1 wherein said seal comprises expanded polypropylene.

10. A door trim panel assembly as set forth in claim 1 wherein said seal and said carrier are integral, unitary, and one-piece.

* * * * *